March 4, 1958 R. C. LEGAT ET AL 2,825,126
FASTENER SLIDER ASSEMBLY MACHINE
Filed April 30, 1954 7 Sheets-Sheet 1
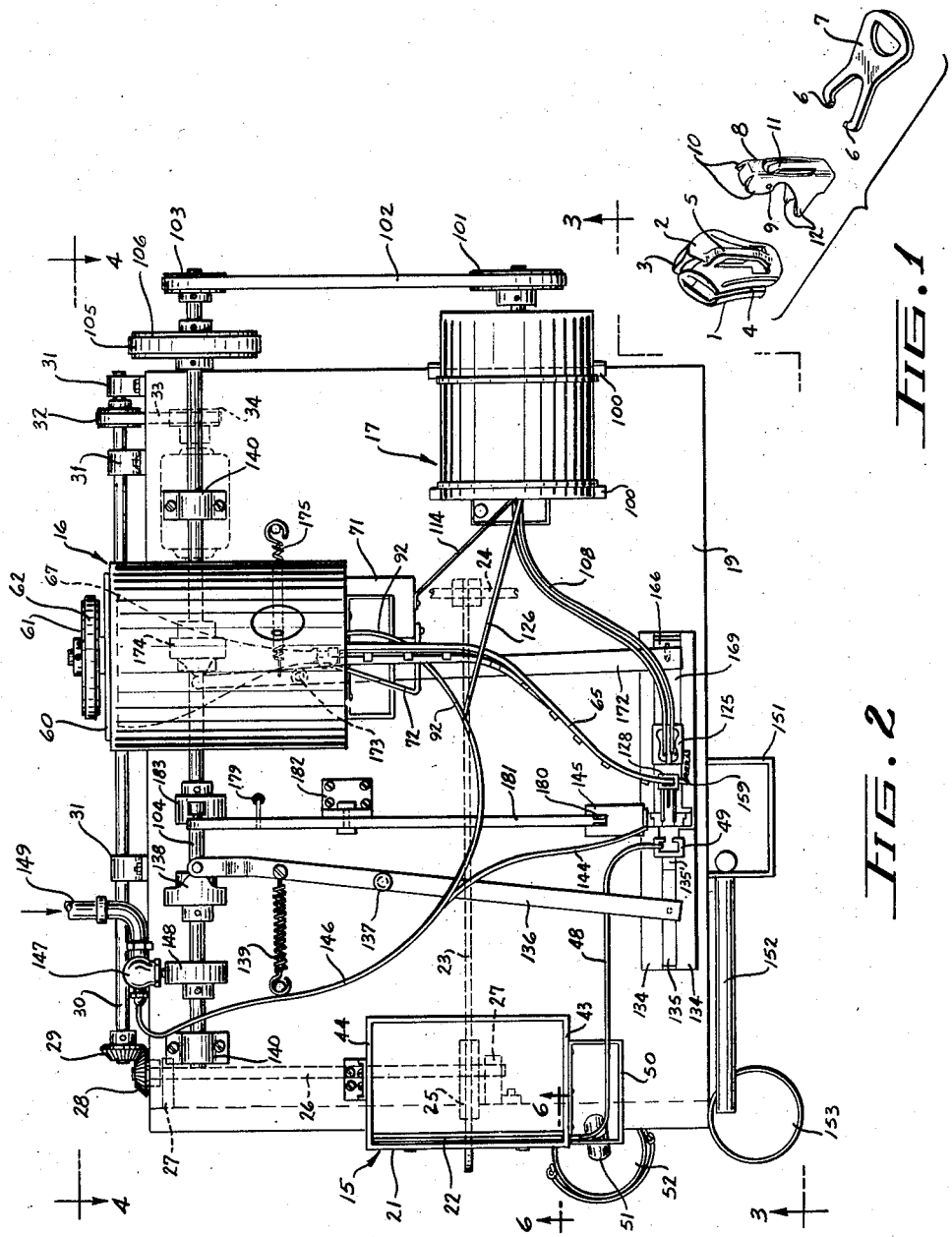
INVENTORS
ROBERT C. LEGAT
STANISLAW MOTYKA
BY
ATTORNEYS March 4, 1958   R. C. LEGAT ET AL   2,825,126
FASTENER SLIDER ASSEMBLY MACHINE
Filed April 30, 1954   7 Sheets-Sheet 2

INVENTORS
ROBERT C. LEGAT
STANISLAW MOTYKA
BY

ATTORNEYS

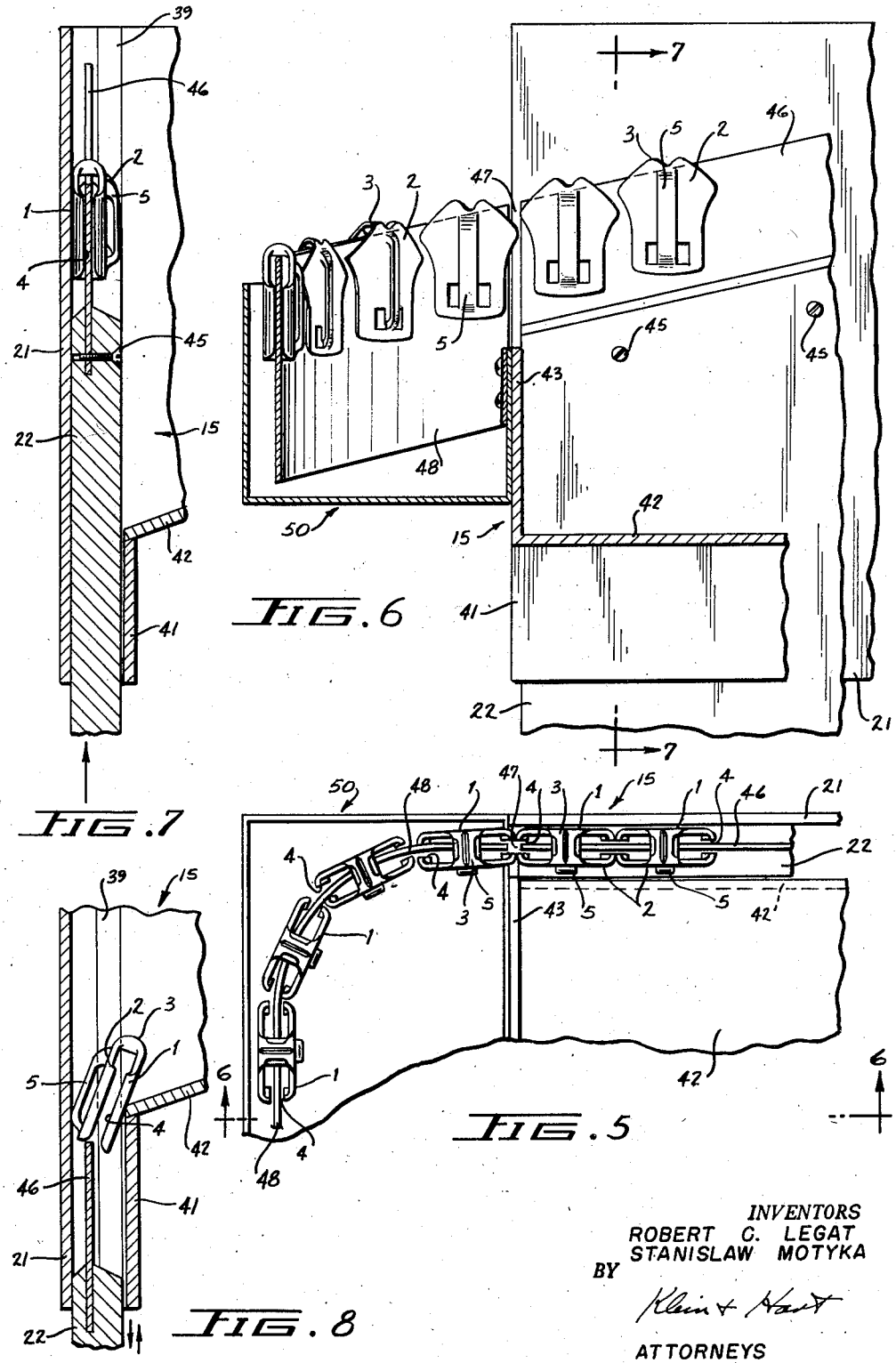

March 4, 1958 R. C. LEGAT ET AL 2,825,126
FASTENER SLIDER ASSEMBLY MACHINE
Filed April 30, 1954 7 Sheets-Sheet 4
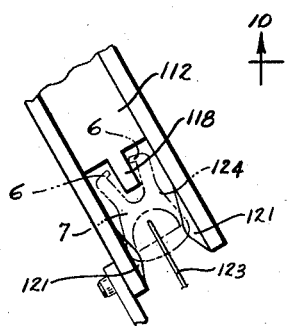
FIG.13
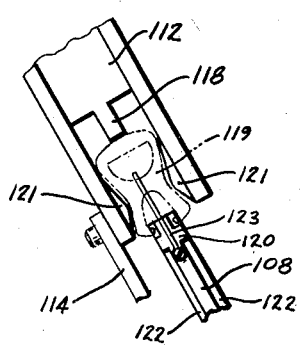
FIG.14
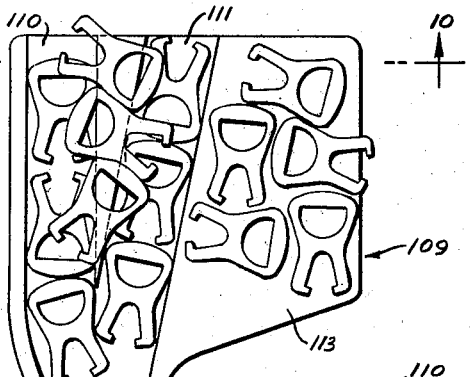
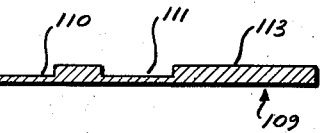
FIG.10
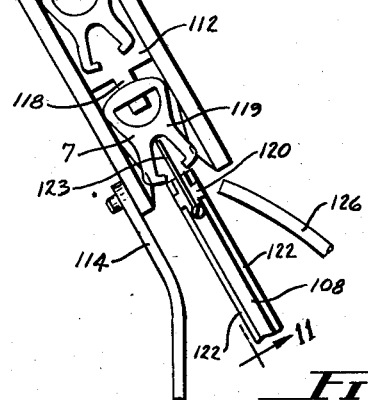
FIG.9
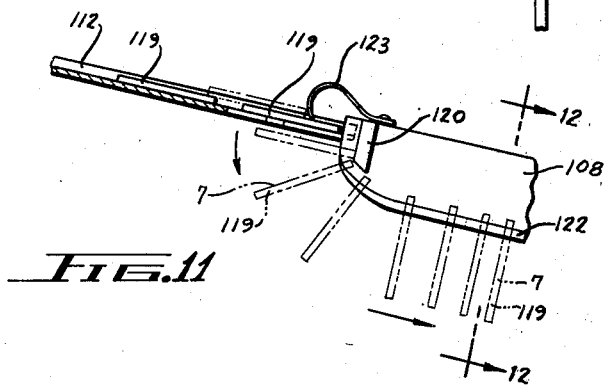
FIG.11
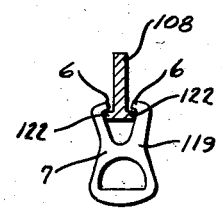
FIG.12
INVENTORS
ROBERT C. LEGAT
STANISLAW MOTYKA
BY
ATTORNEYS March 4, 1958  R. C. LEGAT ET AL  2,825,126
FASTENER SLIDER ASSEMBLY MACHINE
Filed April 30, 1954  7 Sheets-Sheet 5

INVENTORS
ROBERT C. LEGAT
STANISLAW MOTYKA
BY
ATTORNEYS

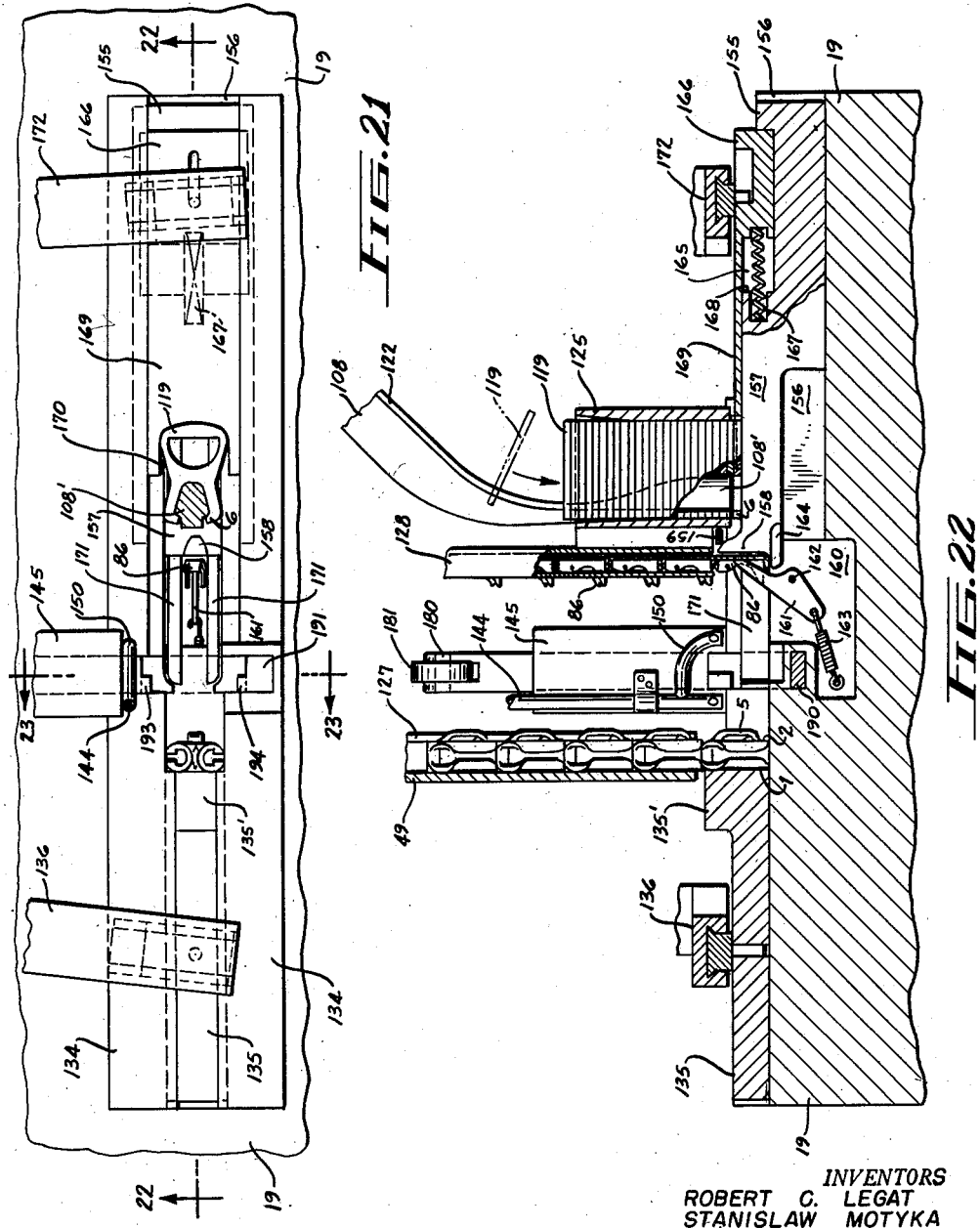
INVENTORS
ROBERT C. LEGAT
STANISLAW MOTYKA

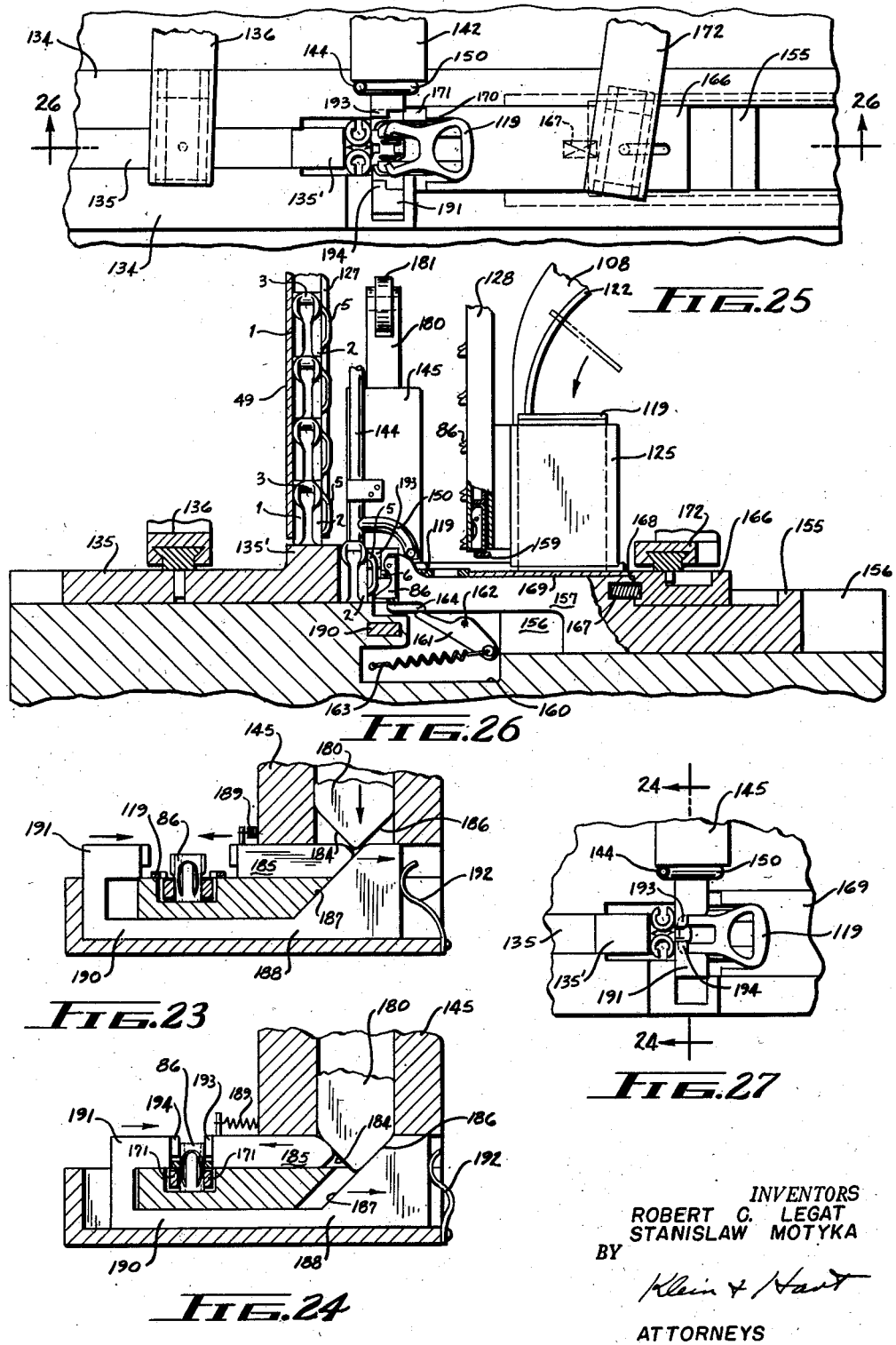

United States Patent Office 2,825,126
Patented Mar. 4, 1958

2,825,126

FASTENER SLIDER ASSEMBLY MACHINE

Robert C. Legat, New Britain, and Stanislaw Motyka, Kensington, Conn., assignors to The G. E. Prentice Mfg. Co., Kensington, Conn., a corporation of Connecticut Application April 30, 1954, Serial No. 426,782

20 Claims. (Cl. 29—211)

This invention relates to an improved machine for assembling sliders for slide operated fasteners.

The sliders for which the machine was particularly designed, comprise a body provided on its front plate with an integral, longitudinal extending lug, a housing member mounted on the body lug and provided with locking projections which extend through openings in the front plate of the body portion into the interior of such body portion, and a pull tab which is connected to the body portion. In the assembly of these three parts, the housing member must be placed on the body lug so that the projections extend through the openings in the front plate of the body portion and must be pivotally connected to such body lug, and the trunnions of the pull tab must be pivotally and slidably connected to the lug so that the pull tab and body portion constitute a complete operative slider and the pull tab will actuate the housing to control the operation of the locking projections thereof.

It is an object of the invention to provide a machine which will automatically assemble the three aforesaid parts rapidly and efficiently.

A further object of the invention is to provide an assembly machine which will select the parts from different loose masses thereof in separate containers, bring them into proper relation for the assembly operation, and then properly assemble them together into complete sliders capable of efficiently performing the operations for which they were designed.

A still further object of the invention is to provide an assembly machine constituted of relatively few parts of simple rugged construction, and which will operate properly over long periods of time with freedom from mechanical difficulty.

Other objects of the invention as well as the novel features of construction thereof, will become apparent from a perusal of the following description when read in connection with the accompanying drawings, in which Fig. 1 is an exploded, perspective view of the type of slider for which the disclosed form of the invention was particularly designed;

Fig. 2 is a top plan view of an assembly machine constructed in accordance with the invention;

Fig. 5 is a partial detailed plan view of the mechanism for selecting the body portions of the sliders;

Fig. 6 is a detailed sectional view taken along the line 6—6 of Fig. 5;

Fig. 7 is a vertical sectional view taken along the line 7—7 of Fig. 6;

Fig. 8 is a view similar to Fig. 7, but showing the selecting means in a different position of its stroke;

Fig. 9 is a detailed plan view of the mechanism for selecting the pull tabs of the sliders;

Fig. 10 is a sectional view taken along the line 10—10 of Fig. 9;

Fig. 11 is a detailed view showing the method of transferring the pull tabs from the selecting mechanism to a delivery chute along the line 11—11 of Fig. 9;

Fig. 12 is a sectional view taken along the line 12—12 of Fig. 11;

Fig. 13 is a detailed view of the discharge end of the delivering mechanism and illustrating how an improperly positioned pull tab is rejected;

Fig. 14 is a view similar to Fig. 13 showing in plan view how a properly positioned pull tab is transferred to the delivery chute;

Fig. 21 is a top plan view of the assembling mechanism;

Fig. 22 is a sectional view taken along the line 22—22 of Fig. 21;

Fig. 23 is a sectional view taken along the line 23—23 of Fig. 21 and showing in enlarged detail the mechanism for clamping the parts together;

Fig. 24 is a view similar to Fig. 23; the section being taken along the line 24—24 of Fig. 27 and showing the position of the parts during the clamping operation;

Fig. 25 is a plan view of the assembling mechanism in a different period of its operation;

Fig. 26 is a sectional view taken along the line 26—26 of Fig. 25; and

Fig. 27 is a plan view of the clamping mechanism during the clamping operation.

Figure 3:
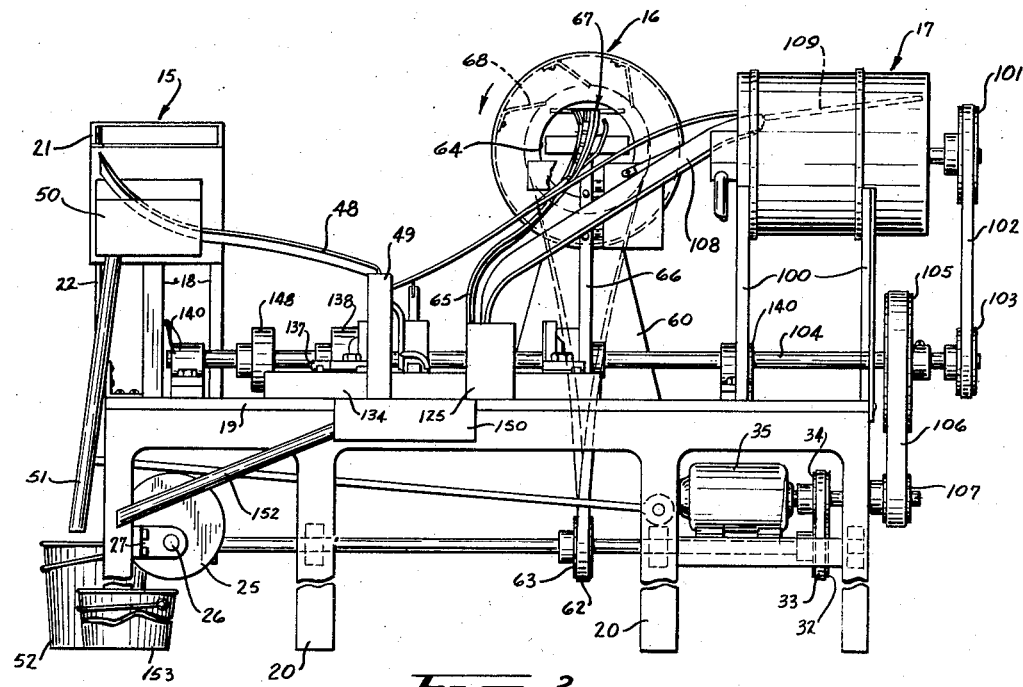
Fig. 3 is a front elevational view of the machine.

It will facilitate the understanding of the assembling machine illustrated, to refer briefly to the exploded view in Fig. 1 of the drawings. As shown in this view, the slider to be assembled includes a body portion composed of two wings or plates 1 and 2 connected at their upper ends by a neck portion 3. The plates 1 and 2 and neck portion 3 are made from a single piece of material, which after it has been processed to complete the form of such plates, is bent in the region of the neck portion to bring such plates into parallel relation, leaving a small slot or slit 4 between the side flanges of such plates. The plate 2 constitutes the outer or front plate of the slider and is provided with a lug 5 extending longitudinally of the slider and being indented in its sides so that it is substantially T-shaped. Extending into the side indentations of the lug 5 are the trunnions 6 of a pull device 7, such trunnions and the flanged outer edge of the lug 5 permanently securing the pull device 7 to the slider in pivotal and slidable relation. A hollow housing 8 is pivotally connected to the lug for rockable movement thereon by a pair of projections 9 formed on the side walls 10 thereon and extending into the side indentations of the lug 5. Formed out of the top wall of the housing is a spring 11 which bears on the outer edge of the lug 5 to normally hold the locking projections 12 in engagement with those locking elements of a fastener within the slider when the pull tab is released, and which yields when a pull is exerted on the pull tab to enable the housing to rock to a position where the projections are drawn out of engagement with such elements. The locking projections 12 extend through openings in the front plate 2 into the interior of the slider body. It will thus be understood that the slider to be assembled by the machine of this invention is constituted of three parts, namely, a body portion, a housing and a pull tab.

In the machine shown in the drawings for the purposes of illustration, the body portions of the sliders to be assembled, are contained in a bin 15, the housings are contained in a drum 16 and the pull tabs are supplied to a drum 17. The bin 15 is of substantially rectangular form and supported by legs 18 (Figs. 3 and 4) standing on and secured to a table 19 forming part of the machine base 20. Extending up through the bin 15 and in sliding engagement with the outer side wall 21 of such bin is a thick plate 22 (Figs. 7 and 8) which rests on the free end of a lever 23 (Figs. 2 and 4) pivotally supported by a cross shaft 24 mounted on the base 20 of the machine. The free end of lever 23 rests on an eccentric 25 secured to a cross shaft 26 rotatably supported by bearings 27, 27 provided on the machine base. The rear end of shaft 26 has connected thereto a bevel gear 28 which is in mesh with a bevel gear 29 secured to an end of a shaft 30 extending along the rear of the machine and rotatably supported by bearings 31 on the machine base. Secured to the other end of shaft 30 is a pulley 32, carrying one end of a driving belt 33, the other end of which is carried by a pulley 34 secured to the shaft of a motor 35. The motor 35 drives continuously during the operation of the machine and through its driving connection with shafts 30 and 26 causes the eccentric 25 to oscillate the lever 23 in a vertical direction on shaft 24. As a result of the oscillating movement of lever 23, the plate 22 will be vertically reciprocated in the bin 15.

Figure 4:
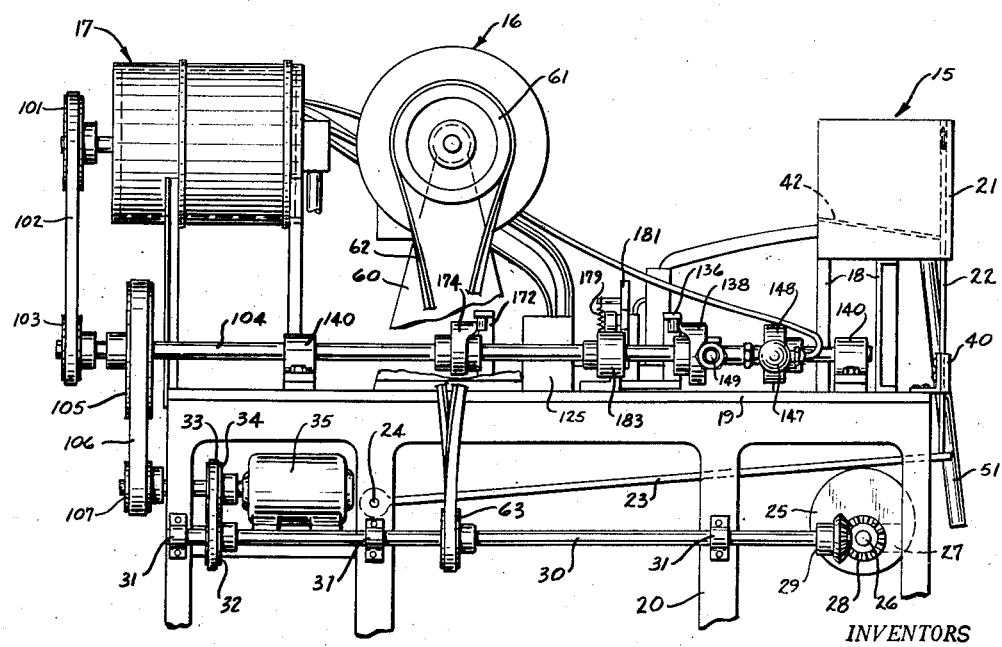
Fig. 4 is a rear elevational view of the machine.

The plate 22 is guided in its reciprocal movements by a V-shaped groove 39 in Figs. 7 and 8 provided on the rear wall of the bin 15, a guide member 40 in Fig. 4 attached to the table 9 and by vertical walls 21 and 41 of the bin 15. As shown more clearly in Fig. 7, wall 41 is spaced from wall 21 a distance slightly greater than the thickness of plate 22 and depends from the outer side edge of the inclined bottom wall 42 of the bin. As will be noted from Figs. 2 and 6 of the drawings, the plate 22 extends the length of the bin 15 and its top edge inclines upwardly from the front wall 43 to the rear wall 44 of the bin. Secured to the top of plate 22 as by screws 45, and projecting above the top edge of such plate, is a thin strip of metal 46 which is supported by plate 22 so that it also inclines from wall 43 to wall 44 of the bin. The strip 46 projects above the top of plate 22 a distance greater than the distance between the neck portion 3 and the free ends of the plates 1 and 2 of the body portion of the slider and is sufficiently thin so that it readily enters into the slot 4 between the flanges of such plates. The width of the space between strip 46 and bin wall 21 is slightly greater than the transverse dimension of rear plate 1 of the slider body, but less than the combined transverse dimension of the front plate 2 thereof and the lug 5, so that strip 46 can only enter the slot 4 of the slider body when the rear plate 1 thereof is between such strip and bin wall 21.

Referring now to Figs. 5 to 8 of the drawings, it will be noted that during the reciprocating movements of the plate 22, its range of movement is such that in its retracted position the strip 46 will be located between the bin walls 21, 41 and below the level of the bottom 42 of the bin, so that slider body portions moving down the inclined bottom will be tipped over into the space between such walls and onto the top of the strip 46. If the outer plate 2 of a body portion is adjacent to wall 21, it cannot slide between such wall and strip 46 (note Fig. 8). As illustrated in Fig. 7, should the inner plate 1 of a body portion fall adjacent to wall 21, strip 46 will partly or fully enter the slot 4 of such body portion. When the plate 22 next advances into the bin 15 those body portions, the inner plates of which are between strip 46 and the bin wall 21 will seat on the top of rail 46 in the manner shown in Figs. 6 and 7, and all other body portions will fall back into the pile thereof resting on the bottom 42. The plate 22 will rise in the bin 15 in its advancement to the position shown in Fig. 7 where the forward end of strip 46 will come into alignment with a slot 47 provided in the front wall 43 of the bin (note Fig. 6). During the reciprocating movement of the plate 22, the threaded body portions will slide down the strip 46 toward wall 43 and during the registry of the strip with slot 47 will pass out through such slot onto a fixed inclined rail 48 which extends to the upper end of a vertical chute 49 (note Figs. 2 and 3). As in the operation of the machine some of the slider body portions will not be properly transferred from the movable strip 46 to the fixed rail 48, such body portions will fall off rail 48 and will be collected in a box 50 secured to the front wall 43 of the bin. A discharge pipe 51 may be secured to the bottom wall of box 50 to discharge the body portions collected in such box, into a pail 52 which may at intervals be emptied into bin 15.

Figure 17:
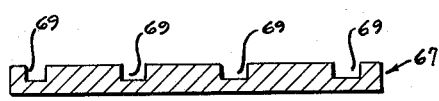
Fig. 17 is a sectional view taken along the line 17—17 of Fig. 15.

Referring again to Figs. 2 to 4, the drum 16 containing the slider housings is rotatably mounted upon a standard 60 supported by and secured to the table 19 of the machine base. The drum 16 is driven by a pulley 61 and a belt 62; the latter passing around a pulley 63 secured to shaft 30. The rear wall of the drum 16 is imperforated, and the front wall thereof is provided with an opening 64 through which extends into the interior of the drum, the upper end of a guide 65 (note also Figs. 15 and 18). Mounted within the drum on a standard 66 in Fig. 3, which is secured to and supported by the table 19 and extends through the opening 64 of the drum, is a fixed guide shelf 67 which is inclined toward the upper end of guide 65 and communicates at its forward or discharge end with the latter. The drum 16 is filled with slider housings to a certain level and rotates at a comparatively low speed in the direction of the arrow indicated in Fig. 3, as a consequence of which the housings under the influence of baffles 68 move upwardly and drop on the guide shelf 67. As shown more clearly in Figs. 15 and 17, the guide shelf is composed of a substantially triangularly-shaped metal plate, in the upper surface of which has been formed four spaced grooves or tracks 69 which converge into a single groove or track 70 at the forward narrow end of the shelf 67. The tracks 69 and 70 have a depth substantially equal to one-half the overall height of a housing and a width substantially equal to the overall width of such housing. Thus, as the housings are dropped on the shelf, many of them will drop into the tracks 69 so as to be longitudinally disposed in such tracks and will gravitate along such tracks toward the single track 70. In order to assist the movement of the housings along the tracks of shelf 67, such shelf is vibrated by a vibrator 71 mounted on standard 66 and connected to shelf 67 by a connecting bar 72 (note Figs. 2 and 15).

Figure 15:
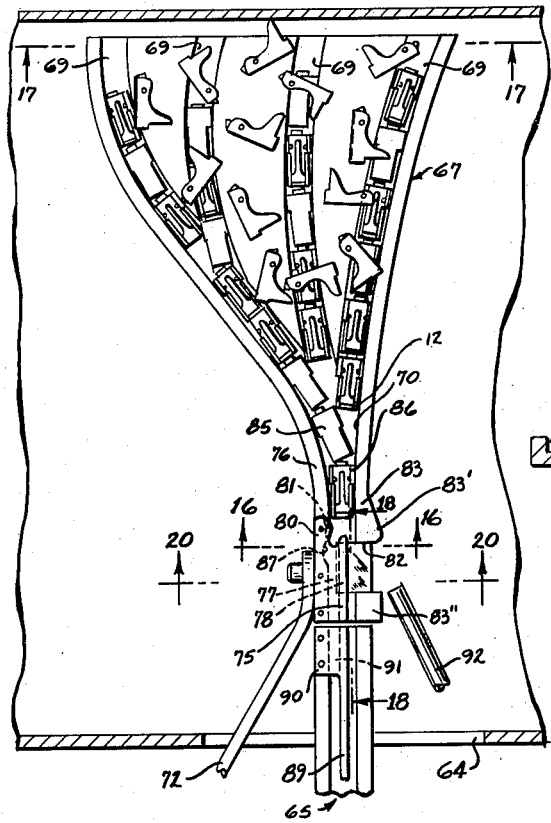
Fig. 15 is a detailed plan view of the mechanism for selecting the slider housings.
Figure 16:
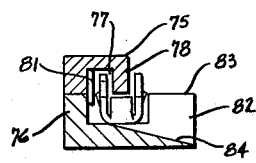
Fig. 16 is a sectional view taken along the line 16—16 of Fig. 15.

With the arrangement which has been described, it will be noted from Fig. 15 that some of the slider housings will be traveling in the tracks 69, 70 on their backs and with the locking projections 12 thereof extending upwardly, while other housings will be traveling with the projections thereof engaging the bottoms of the tracks. Some housings also will be traveling with the locking projections thereof to the front, while others will be traveling with the locking projections to the rear. As it is desirable to select only those housings which are positioned on their backs in the tracks and with the upstanding locking projections 12 thereof at the front, the discharge end of track 70 is provided with means to eliminate all housings otherwise positioned. As illustrated in Figs. 15 and 16, the discharge end of track 70 is provided with a cover plate 75 which is secured along one side edge to side 76 of such track in any suitable fashion, and has a width such that the other side edge thereof is located between the inner side walls of the track. As shown in Figs. 15 and 16, the plate 75 is provided with a longitudinally extending groove 77 in its underface to form from such other side edge thereof a longitudinally extending rib 78 which is disposed substantially centrally with relation to the inner side walls of the track (note also Figs. 18 and 19). One wall of groove 77 is flush with the inner wall of side 76 of the track, and such groove has a depth substantially equal to the depth of track 70, so that the passageway formed by such track and groove 70 has a depth greater than the overall depth or height of a slider housing. At the entry end of such passageway, the rib 78 is provided with a beveled surface 79 to enable the forward end of such rib to readily enter between the locking projections of a housing. At the entry end of such passageway the plate 75 has an extension 80 to the inner side of which is secured a pin 81 which is located in such passageway adjacent to the inner wall of side 76 of the track and tends to direct the housings toward an interruption or opening 82 in side 83 of track 70. It will be noted from Fig. 16 of the drawings, that the opening or interruption 82 is provided with an inclined surface 84; such inclined surface extending into track 70 to a point between the rib 78 and the inner wall of side 76 of the track.

It will be understood from the foregoing, that all slider housings gravitating down the track 70 toward the plate 75 will initially come into engagement with the pin 81 on the extension 80 of such plate. Pin 81 has a rounded inner surface which when a housing bumps thereagainst, directs the leading end of the housing toward the opening 82 in the side 83 of such track. Should such a housing be positioned in the track with its locking projections in engagement with the bottom of the track, as for example, the housing designated 85 in Fig. 15 of the drawings, the leading end of the body of such housing will bump into the forward end of the inverted rail or rib 78 of the plate and the latter will prevent further advancement of the housing along the track. Due to the somewhat unstable support provided by the locking projections for such housing, the diversion of such housing by the pin 81 toward the side 83 of the track, and the vibratory motion imparted to the track, such a halted housing will jump the track in the region of the widened side portion 83' thereof and fall from the latter back into the bottom of the drum 16. Should such a housing be positioned on its back in the track with the upstanding locking projections thereof at the leading end of the housing, as for example, the housing designated 86 in Fig. 15 of the drawings, the left hand locking projection as viewed in such figure, after the housing has struck the buffer stop or pin 81, will normally catch the rib 78 and pass between such rib and the side 76 of the track 70. However, should it occur that the front of the housing is directed to such an extent by the buffer pin 81 as to cause such projection to miss the rib 78, the housing will be rejected over the widened side portion 83' of the track 70 and returned to the drum. When the left hand projection of such a housing catches on the rib 78, the forward end of the housing will be guided by the rib 78 along the track 70 past the opening 82. It will be noted from Fig. 16, that while the housing 86 is advancing past such opening 82, one longitudinal edge portion of its back only is in engagement with the bottom wall of track 70; the housing being kept from tilting and sliding down the ramp or incline 84 by the guiding action of the rib 78 on the left hand projection of such housing and of the sides 76 and 83 of the track 70 on the rear end of such housing. The length of opening 82 is less than the length of the housing and such that when the forward end of such housing enters into the terminal end of such track between side 76 and portion 83" of the side 83 thereof, the rear end of such housing is leaving the portion of such track defined by side 76 and portion 83' of the side 83. Thus, even though the rear end of the housing 86 may sway slightly under the rail or rib 78 during the further advancement of such housing, the side 76 and side portion 83" will prevent it from falling down the ramp or incline 84 and cause the housing to be properly guided into the entry end of the chute 65.

Figure 18:
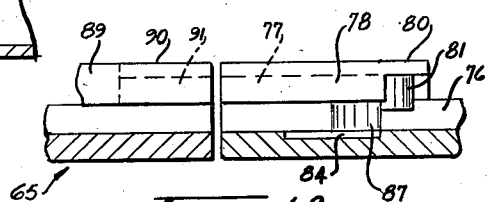
Fig. 18 is a sectional view taken along the line 18—18 of Fig. 15.
Figure 19:
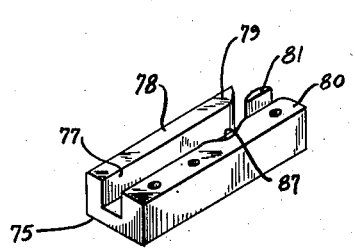
Fig. 19 is a perspective bottom view of the cover plate provided on the discharge end of the selecting mechanism.
Figure 20:
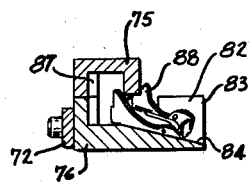
Fig. 20 is a sectional view taken along the line 20—20 of Fig. 15.

Should a housing approaching the plate 75 be positioned on its back in the track 70 with the upstanding locking projections thereof at the following end of the housing, when the leading end of such housing strikes the buffer pin 81 in Figs. 15, 16 and 18, such end by reason of the fact that it has a height less than the height of the rib or rail 78 above the bottom of the track, will not be caught by such rail but will be directed under the same toward the opening 82 and off the straight portion of the bottom wall of such track onto the ramp or incline 84. As the housing advances onto the incline 84 it will tend to tilt toward track side 76 and slide down incline 84. Thus, when the left hand locking projection, as viewed in Figs. 15 and 20, enters between rail 78 and side 76 of the track, the housing will have sufficiently tilted and the forward end thereof moved down on incline 84 to such an extent that such projection will readily move down under rib 78 and the housing will be discharged down incline 84. The inner wall of side 76 of the track and the adjacent inner wall of the groove 77 in plate 75, adjacent to the buffer pin 81 are formed to provide a concave surface portion 87 which enables the left hand projection of the housing to fall with a turning motion so that the housing can readily be discharged from the track in the manner indicated by the housing designated 88 in Fig. 20 of the drawings.

To facilitate the rejection of those housings positioned otherwise than that desired, the discharge end of an air hose 92 in Figs. 1 and 5 is directed toward the entry end of plate 75 and means are provided to cause blasts of air from such hose to hit the housings at predetermined intervals to assist in the removal of the housings to be rejected. The means for creating such blasts of air will be hereinafter more fully explained.

The entry end of chute or guide 65 is provided with an inverted rail 89 in Figs. 15 and 18 disposed in alignment with rib 78 to insure that the selected housings 86 are properly positioned in such chute before advancing along the same to the assembling mechanism. Rail 89 is formed on a plate 90 which is mounted on that side of guide 65 aligned with side 76 of track 70 and which is provided on its under surface with a groove 91 aligned with and similar in cross section to the groove 77 of plate 75.

The drum 17 containing the pull tabs of the sliders to be assembled, is rotatably supported on the upper ends of saddles 100 in Figs. 2 and 3 mounted on and secured to the table 19 of the machine base. The drum is driven by a pulley 101 and a belt 102, the latter passing around a pulley 103 secured to one end of shaft 104. Shaft 104 is drivenly connected by a pulley 105, belt 106 and pulley 107 to the shaft of motor 35. Like drum 16, drum 17 has an imperforate rear wall and a front wall opening, through which extends one end of a guide 108. Located within the drum and communicating with the entry end of guide 108 is a fixed guide shelf 109 (note Figs. 3 and 9) which is supported in inclined fashion and upon which the baffles (not shown) of the drum drop the pull tabs in the manner previously explained with respect to guide shelf 67, as the drum 17 is slowly rotated. As shown more clearly in Fig. 9 of the drawings, the guide shelf 109 is composed of an irregularly shaped plate in the upper surface of which is formed two grooves 110, 111 which converge into a single groove or track 112 at the narrow discharge end of the plate. As will be observed from Fig. 11 of the drawings, the grooves or tracks are slightly deeper than the thickness of the pull tabs and such grooves have a width substantially equal to the overall width of the pull tabs to be processed. In the region of the converging tracks 110, 111, the plate is provided with a shelf portion 113. The discharge end of the inclined plate 109 is connected by an arm 114 to the vibrator unit 71 (note Fig. 2).

It will be seen from the foregoing that those pull tabs dropped on the enlarged end of plate 109, will, due to the incline of such plate and the vibratory motion imparted thereto, either drop off such plate or dance over such enlarged end until they become seated in the grooves 110 and 111 from whence they will gravitationally move toward track 112. It will be noted from Fig. 9 that the pull tabs will be longitudinally disposed in the grooves or tracks and that their prongs or trunnions 6 will either be in a leading or trailing position. As it is desired to select only those pull tabs which are positioned in track 112 with their trunnions in a leading position, the discharge end of track 112 and the entry end of guide 108 are formed to accept such pull tabs and to reject those pull tabs with their trunnions in a trailing position. The bottom wall of track 112 at its discharge end is cut out to provide a centrally located tongue 118 (note Figs. 9, 13 and 14) which extends forwardly from a point spaced from the terminal end of track 112 a distance greater than the length of a pull tab. The length of the tongue 118 is such that it will support the trailing end of a pull tab which is positioned in the track 112 with its trunnions in a leading position, as for example, the pull tab 119 shown in Figs. 9 and 14 of the drawings, until the trunnions thereof have almost engaged stops 120, 120 provided on guide 108 in opposed relation to the discharge end of track 112. The cutout in the bottom wall of track 112 also provides a pair of ears 121 projecting in opposed relation from the sides of such track at the terminal end thereof. The ears 121 are configured so that when the trailing end of the pull tab 119 has traveled off the tongue 118 the pull tab will fall free through the bottom of track 112, as shown in Fig. 11.

The guide 108 is constituted of a T-shaped strip of metal so that a pair of outwardly extending flanges 122, 122 is provided along the lower edge of the strip, as is shown more clearly in Fig. 12 of the drawings. At the entry end of the guide 108, the flanges 122, 122 curve upwardly and diminish in thickness to a point, as shown in Fig. 11 to enable the trunnions of the pull tabs 119 to more readily catch on such flanges. The pointed ends of flanges 122, 122 are spaced below the discharge end of track 112. Spaced behind the pointed entry end of each flange 122 is a stop member 120 secured to or integral with the sides of the metal strip. The stop members 120, 120 extend upwardly on the strip from the pointed ends of flanges 122, 122 to the top of the track 112 so that they are disposed in opposed spaced relation to the terminal end of such track (note Fig. 11). Secured to the top of the metal strip is a light spring 123 which projects over the entry end of guide 108 and into the discharge end of track 112 to prevent the advance of any pull tabs which may be riding on the pull tabs in the track; such spring together with the vibrator causing such pull tabs to be discharged over the sides of the guide 112 before they reach the guide 108.

It will be understood from the foregoing, that the pull tabs gravitating down the tracks 110, 111 and 112 toward the guide 108 will be in either of two positions, namely, with their trunnions 6 thereof in a leading position, as the pull tab designated 119 in Figs. 9 and 14, or with the trunnions thereof in a following position, as the pull tab designated 124 in Figs. 9 and 13 of the drawings. When a pull tab 119 which has the trunnions in a leading position, reaches the end of track 112, it will be supported by the bottom wall of the track and tongue 118 until the trunnions rest on the ears 121 formed out of the bottom wall of the track. As the pull tab 119 continues its advancing movement, it will be supported by the tongue 118 and ears 121 until just before the trunnions thereof engage the stops 120 on guide 108 (note Fig. 9). When the trunnions of pull tab 119 engage stops 120, the following end of such pull tab has passed off the tongue 118 and the ears 121 (note Fig. 14). The pull tab 119 is therefore free to drop through the bottom wall of track 112; the stops 120 acting as guides during such falling movement of the pull tab until the trunnions thereof hook onto the entry ends of the flanges 122. With the pull tab 119 thus supported in depending relation on the flanges 122, it will gravitate along the guide 108 until it reaches a receptacle 125 (note Fig. 22), where it will be continued in stack form with the trunnions still connected to the guide 108.

When a pull tab, such as the pull tab designated 124 approaches the discharge end of track 112 with the trunnions thereof in trailing position, such pull tab will be supported by the bottom wall of the track and the tongue 118 until the forward or finger engageable end just rides on the ears 121 formed in such track. Soon after engaging such ears, the tab will pass off the tongue 118, permitting the trunnions thereof to swing down into spaces between the tongue 118 and the side walls of the track 112 (note Fig. 13) and thereby permit the pull tab to fall through the opening in the track wall in back of the ears 121. The end of a hose 126 in Figs. 2 and 9 through which periodic puffs of air under pressure, are blown in a manner to be hereinafter explained, is positioned relative to the track 112 so that such puffs of air facilitate the discharge of the pull tab from the ears 121. The air puffs also prevent possible sticking of a properly aligned pull tab 119 in its approach to the guide 108.

As previously mentioned, the selected body portions of the slider are delivered by the guide strip 48 in Fig. 2 to a chute or hopper 49 in which such body portions are seated one on the other in vertical end-to-end fashion with the bottom ends of adjacent upper bodies seated on the top ends of adjacent lower bodies. One side face of the chute 49 is provided with a vertical slot 127 (note Figs. 22 and 26) in which the lugs of the slider bodies are located; such lugs and slot cooperating to maintain the slider bodies in properly aligned relation. The selected housings 86 of the slider are delivered by the guide chute 65 to a vertically disposed chute or hopper 128 in Fig. 2 disposed in spaced relation to the body chute 49 and located intermediate the latter and the receptacle 125 in which the pull tabs are stacked (note also Figs. 22 and 26). The housings 86 are positioned in the chute 128 with the locking projections thereof arranged at the bottom and projecting from an open side of the chute in opposed relation to the lugs of the slider bodies in chute 49. The pull tabs 119 are stacked in receptacle 125 with their spaced trunnions extending toward the chutes 49 and 128 and in the same direction as the locking projections of the housings. It will be noted from Fig. 22 of the drawings, that guide 108 extends vertically along one side of the container 125 down to the bottom thereof and that the end portion of the guide gradually changes in shape in a downward direction to gradually reduce the width of the body of such guide and to gradually enlarge the dimensions of the flanges 122 thereof, so that the terminal end 108' of such guide has the cross sectional area shown in Fig. 21 of the drawings. Thus, the terminal end 108' of the pull tab guide substantially conforms in cross sectional area to the space defined by the lugs and trunnions of the pull tab 119 so that positive control of the pull tab is maintained at the bottom or discharge end of container 125.

It will be seen from the foregoing that the selected slider bodies, housings 86 and pull tabs 119 are delivered in stacked relation in predetermined position relative to each other and are arranged in proper relation to be assembled readily by the mechanism now to be described. As shown in Figs. 21 and 22 of the drawings, there is slidably mounted on the front edge portion of table 19 between guide members 134, 134, a slide 135 reciprocally movable toward and away from the chute 49 in a direction at right angles to the outer side of such chute. Reciprocating movement is imparted to slide 135 by an arm 136 pivotally and slidably connected at its front end to such slide in any suitable manner, and pivotally movable about a fixed axis 137 by a cam 138 secured to shaft 104 (note Fig. 2). The cam roller provided on the rear end of arm 136 is maintained in engagement with the cam 138 by a strong spring 139 secured to such arm intermediate the axis or pivot 137, and such cam roller, and to a pin provided on table 19. Shaft 104 is rotatably supported on the rear of table 19 by a pair of bearing brackets 140, 140 and is driven from motor 35 through a pulley 107, belt 106 and pulley 105 (note Fig. 3.) It will be observed from Figs. 21 and 22 of the drawings, that in its retracted position, the forward face of the advancing or leading end 135' of the slide 135 is substantially flush with the inner surface of the outer side of chute 49. The chute 49 terminates at a point spaced above the table 19 a distance slightly greater than the length of a slider body, and the slide end 135' is enlarged so that it has a depth substantially equal to the length of a slider body. The inner ends of the guides 134, 134 from the region of the chute 49 have straight opposed vertical side surfaces which are flush with the inner surface of the front and rear walls of the chute 49. Thus, in the retracted position of slide 135, the end 135' thereof and the ends of guides 134, 134 form a continuation of chute 49 and permit the bottom end of the lowermost slider body to come to rest on table 19 with the rear plate of such slider body against the forward face of the end portion 135' of the slide and with the sides of such slider body engaging the opposed vertical surfaces of the guides 134, 134. On the advancing stroke of slide 135 the lowermost slider body is moved inwardly in front of the discharge end of an air hose 144 supported by a bracket on the front face of a plunger housing or guide 145. The front guide 134 is shorter than the rear guide 134 and the inner end of the former terminates at a point where its end face will be substantially flush with the advancing or inner end surface of the slide 135 at the end of the advancing movement of said slide. During the advancing movement of slide 135, the stack of slider bodies in the chute 49 will be supported by the end 135' of such slide, as shown in Fig. 25 of the drawings. The slide 135 will remain in this advanced position until a housing and a pull tab have been assembled on the slider body and the completed slider discharged by a blast of air from the hose 144. The hose 144 is connected to hoses 92 and 126, and as shown in Fig. 2, such hoses are connected by a common hose 146 to a suitable valve 147 connected to a source of air pressure (not shown) by a pipe 149 and having a spring pressed valve member controlled by a cam 148 secured to shaft 104.

The housing 86 and pull tab 119 of the slider are advanced into assembled position by a compound slide construction in Figs. 21, 22, 25 and 26 composed of a main slide 155 slidably movable in a guide slot 156 provided in the table 19. The slide 155 has a forward extension 157 provided with an enlarged terminal end 158. It will be noted in Fig. 22 that the bottom end of the chute or hopper 128 is spaced above the table a distance slightly greater than the length of a housing 86, and that in the retracted position of slide 155, the end face of slide end 158 forms a continuation of one side wall of the chute 128. The area of the end face on slide part 158 is substantially equal to the top or outer wall of the housing. It will also be noted from Fig. 22 that the top edge of slide part 158 is cam-shaped and in its retracted position engages and holds in retracted position a spring finger 159 which advances into position to support the stack of housings 86 in chute 128 when the slide 155 advances, as shown in Fig. 26. Located in a slot 160 in the table 19 is a finger 161, mounted for pivotal movement about an axis 162 and normally biased by a spring 163 to engage and hold the lowermost housings 86 in the stack against the end face of slide part 158 (note Fig. 22). The finger 161 is so designed that during the initial advancement of slide 155 it maintains its engagement with the lowermost housing, yieldingly resisting the advancement of such slide. As the slide 155 advances the housing to a position adjacent to its place of assembly on the slider body, an abutment 164 on slide part 158 engages such finger and depresses it into slot 160 against the tension of spring 163 where it will not interfere with the assembly operation, as shown in Fig. 26 of the drawings. The formation of the housing 86 and the lug 5 of the body portion is such that at the end of the stroke of slide 155, the advancing housing 86 will readily receive such lug 5 and the locking projections 12 of such housing will enter into the openings provided therefor in the front plate 2 of the body portion.

Slidably mounted in a longitudinal groove 165 on the slide 155 is an auxiliary slide 166 which is normally biased to retracted position relative to slide 155 by a spring 167 located between slide 166 and the forward end wall 168 of groove 165. The spring 167 is seated in pockets formed in wall 168 and in the forward end of slide 166, so that such slide has a range of movement defined by the forward end wall 168 and the other end wall of groove 165 (compare Figs. 22 and 26). The slide 166 is provided with a forward extension 169 which slides on the top surface of the extension 157 of slide 155 and which has a recess 170 provided in its outer or forward end to enable it to straddle the finger-grasping end of the lowermost pull tab in the stack thereof (note Fig. 21). The container 125 for the stack of pull tabs 119 is spaced above the upper surface of the extension 157 of slide 155 a distance slightly greater than the thickness of a pull tab to enable the extension 169 of slide 166 to advance the lowermost pull tab in the stack toward the body portion on which it is to be assembled. During the advancement of a pull tab 119 by the slide 166, it rides on a pair of guide members 171, 171 located on each side of the slide extension 157 and having upper surfaces arranged to deliver the pull tab 119 to the slider body in proper relation to the stud thereof and the housing to be assembled on such body. In the advancement of the slide 166 from its retracted position the stack of pull tabs is supported by the extension 169 (note Fig. 26).

The slide 166 is pivotally and slidably connected to the front end of a lever arm 172 mounted for pivotal movement about an axis 173 fixed with relation to the table 19 and actuated at its rear end by a cam 174 secured to shaft 104 (note Figs. 2 and 4). The cam roller on the rear end of arm 172 is maintained in contact with cam 174 by a strong spring 175 which is connected to arm 172 between its pivot 173 and such cam roller (note Fig. 2). When arm 172 is actuated by cam 174 to advance slide 166 to the left, as viewed in Fig. 22 of the drawings, the extension 169 of such slide will advance the bottom pull tab in the stack until the forward wall of slide 166 engages wall 168 of slot or groove 165. In this position of the slide 166, the extension 169 thereof will have advanced the pull tab 119 to a position where its legs straddle the end part 158 of slide 155 and the bottom housing 86 in chute 128, and the trunnions 6 on such legs are positioned in advance of end part 158 and such bottom housing 86. As arm 172 continues its movement, slides 166 and 155 advance as a unit to receive the bottom housing 86 from the chute 128 without changing its relation to the pull tab 119 and advance both the housing and the pull tab in such relation toward the slider body, as shown in Fig. 26 of the drawings. When the compound slide as a unit reaches the end of its forward movement, the housing 86 will be positioned on the lug 5 of the slider body, as has been explained, and the prongs of the pull tab 119 will be properly positioned with relation to such lug 5 for attachment thereto. Mechanism then comes into operation to pivotally attach both the housing 86 and the pull tab 119 to the lug 5.

As shown in Figs. 23 to 27, the mechanism for securing together the three assembled parts includes a plunger 180 mounted for vertical reciprocal movement on the housing or guide block 145, and pivotally connected at its upper projecting end with the forward end of a lever arm 181 mounted for movement about a horizontal axis on a bracket 182 secured to table 19 (note Fig. 2). The rear end of arm 181 is provided with a cam roller which rides on a cam 183 secured to shaft 104 and which is maintained in engagement with such cam by a spring 179 connected to such arm between such roller and bracket 182 and to the table 19. The lower end of plunger 180 in Figs. 23 and 24 is provided with a V-shaped cam face, side 184 of which engages the end of a slide 185, and side 186 of which coacts with the inclined cam face 187 of a slide 188. Slide 185 which is located in a slot at the lower end of guide block 145 and slidably movable on table 19, is normally retained in its retracted position (Fig. 23) by a spring 189 connected to block 145 and to a post on such slide. Slide 188 is slidably movable in a guide slot provided in table 19 and has a forward extension 190 projecting beyond the slide 185 and on the forward end of which is provided a raised part 191 extending in opposed relation to the slide 185. Slide 188 is normally maintained in a retracted position by means of a leaf spring 192. It will thus be seen that in the downward movement of plunger 180, the apex-shaped bottom end thereof will enter between the inner end of slide 185 and cam surface 187 of slide 188 and through the cam faces 184 and 186 of such apex will force slides 185 and 188 apart in opposite directions against the tension of their respective associated springs, thereby causing the outer end of slide 185 and the free end of slide part 191 to approach each other. The opposing faces of the slide 185 and slide part 191 during the advancing movement thereof toward each other engage the spread legs of the pull tab 119 located therebetween and squeeze such legs together to position the free ends of the trunnions 6 thereon in slidable and pivotal relation in the depressions in the sides of the slider body lug 5 within the outer wall thereof. At the same time, projection 193 on slide 185 and projection 194 on slide part 191 (note Fig. 24) engage the opposite side walls of the housing 86 and squeeze them together to cause the projections 9 thereof to catch under the outer wall of the slider body lug to pivotally connect the housing 86 to such lug 5.

While it is believed that the foregoing description will provide an understanding of the operation of the machine of this invention, it might be stated briefly that during each cycle of operation of the machine, the parts are so constructed and arranged that the lever arms 136 and 172 will be substantially simultaneously actuated to advance slide 135 and the compound slide composed of main slide 155 and auxiliary slide 166. In the advancement of slide 155, the bottom slider body in chute 49 is advanced into position where the slot 4 in the body portion thereof will be positioned in front of the hose end 144, and the lug 5 thereof will be positioned between the working faces of slide 185 and slide part 191, as shown in Fig. 26 of the drawings. During the advancement of slide 135, auxiliary slide 166 will be advanced to advance the lowermost pull tab 119 from the stack thereof into proper straddling relation with the lowermost housing 86 in the chute 128, and then both auxiliary slide 166 and main slide 155 will advance as a unit with the housing 86 and pull tab 119 so positioned relative to each other to position such parts in proper relation with respect to the lug 5 in the slider body for attachment thereto. The slides 185 and 188 are then actuated by the plunger 180 to secure the housing 86 and the pull tab 119 to the slider body lug 5 in the manner previously explained. Slide 135 is then withdrawn to its retracted position to permit a new slider body to drop to the table 19. During the withdrawal of slide 135, slide 166 withdraws and when it comes into engagement with the rear end of slot or groove 165 causes main slide 155 to withdraw with it as a unit. During the withdrawal of slide 155 the finger portion of pull tab 119 will ride up the cam edges of slide part 158. As soon as this occurs, plunger 180 withdraws to permit the slides 185 and 188 to retract under the tension of their associated springs. When the assembled slider is released, valve 147 is actuated to cause a blast of air to be emitted from the hose end 144 and branch 150 connected to such hose and to discharge the assembled slider into a receptacle 151 mounted on the front of table 19 in Fig. 2. The assembled sliders may be discharged from receptacle 151 through a pipe 152 to a pail 153. During the withdrawal movement of slide 155 it retracts spring finger 159 to permit the next housing 86 to drop onto the table. At the same time, finger 161 is advancing under the tension of its spring 163 and will engage such dropped housing to hold it in proper position against the forward face of slide part 185 as in Fig. 22. Slide 166 will withdraw to a position where its ends will straddle the lowermost pull tab 119 in the stack as the latter drops onto the extension 157 of slide 155. When the valve 147 is actuated to cause a blast of air to be sent to the end of hose 144 and branch 150, such blast of air will also travel to the hoses 92 and 126 to be discharged at the ends of tracks 70 and 112, respectively.

While we have hereinabove described and illustrated a preferred embodiment of our invention, it will be apparent to those skilled in the art that various changes and modifications may be made therein without departing from the spirit of the invention or the scope of the appended claims.

We claim:

1. In an assembly machine for fastener sliders, a supporting brace, a container mounted on said base for a bulk mass of formed slider bodies having spaced front and back plates and lugs on the front plates thereof, a chute mounted on said base in spaced relation to said container and having its lower end spaced vertically above a guide surface on said base a distance at least equal to the length of a slider body, a fixed inclined rail extending from a discharge opening in said container to the entry end of said chute and on which said slider bodies can gravitate in straddled position toward said chute, the entry end of said rail being positioned above the bottom of said container, a reciprocating rail mounted in said container and constructed and arranged to select and lift slider bodies from the bulk mass and to gravitate them in straddled position towards the discharge opening thereof and to the entry end of said fixed rail, reciprocating means for advancing a slider body deposited on said guide surface below said chute along said guide surface to a place of assembly on said base spaced from said chute, and means at said place of assembly for attaching a slider part to the lug on said slider body.

2. An assembly machine such as defined in claim 1, in which said container is provided with an elongated trough in the bottom thereof, and said movable rail is a vertically disposed thin strip extending lengthwise and inclining upwardly from the wall of the container provided with said discharge opening, and including means for supporting said strip for vertical reciprocating movement in said container and means for reciprocating said strip from a position in said trough to a raised position in which the lower end thereof is in alignment with the entry end of said fixed rail.

3. An assembly machine such as defined in claim 1, in which said container is provided with an elongated bottom trough extending along one wall thereof and is provided with a bottom wall inclining downwardly toward the inner longitudinal edge of said trough, and in which said movable rail is a vertically disposed thin strip located adjacent to and substantially parallel with said one wall, said strip extending lengthwise and inclining upwardly from the wall of the container provided with said discharge opening, and including means for supporting said strip for vertical reciprocating movement substantially parallel to said one wall and means for reciprocating said strip from a position in said trough to a raised position, in which the lower end thereof is in alignment with the entry end of said fixed rail, the space between said one wall and said strip having a width less than the combined transverse dimension of the front plate and lug of the slider bodies that said strip can select only slider bodies having their lugs disposed away from said one wall.

4. In an assembly machine for fastener sliders, a supporting base, a chute mounted on said base for holding a stack of formed slider bodies having front plates provided with tab holding lugs, with said lugs all disposed on one side of said chute, said chute having its lower end spaced vertically above a guide surface on said base a distance at least equal to the length of a slider body, a second chute mounted on said base in spaced relation to said slider body chute for holding a stack of slider pull tabs with their trunnions disposed toward the lugs on said slider bodies in said first mentioned chute, said pull tab chute having its lower end spaced vertically above said space and above a pull tab supporting surface a distance at least equal to the thickness of a pull tab, a container for a bulk mass of formed pull tabs mounted on said base in spaced relation to said pull tab chute, a fixed inclined rail extending from said container to the entry end of said pull tab chute, said rail having longitudinally extending flanges for supporting the pull tabs by their trunnions in depending relation and on which said pull tabs can gravitate in depending condition toward said pull tab chute, means in said container for selecting pull tabs from the bulk mass and positioning them in depending relation on the entry end of said rail, reciprocating means for advancing a slider body deposited on said guide surface below the chute therefore along said guide surface to a place of assembly located on said base between said slider body chute and said pull tab chute and spaced therefrom, reciprocating means for advancing a pull tab deposited on said supporting surfaces below the chute therefore toward said place of assembly, and means at said place of assembly for attaching the trunnions of such pull tab to the lug on said slider body.

5. An assembly machine such as defined in claim 4, in which the means for selecting said pull tabs includes a shelf inclined down toward the entry end of said fixed rail and communicating at its discharge end with the latter, said shelf having a plurality of grooves merging into a single groove at the discharge end thereof, and means at the discharge end of said single groove for selecting only those pull tabs with trunnions in a leading position, and including an abutment on the entry end of said fixed rail for halting the advancing movement of the selected pull tabs and for causing the trunnions thereof to engage the flanges at the entry end of said rail.

6. An assembly machine such as defined in claim 5, in which said selecting means at the discharge end of said single groove comprises a tongue connected to the bottom wall of said groove and extending forwardly from a point spaced from the terminal end of said groove into an opening in said bottom wall, and comprises a pair of ears projecting in opposed relation from the sides of said groove at the forward end of said opening and constructed and arranged with relation to said tongue that said ears and tongue coact to permit the advancement of pull tabs with trunnions in a leading position to said fixed rail and to permit pull tabs with trunnions in a following position to fall through the opening in said bottom wall of said single groove.

7. An assembly machine such as defined in claim 4, in which the means for selecting said pull tabs comprises a groove inclined down toward the entry end of said fixed rail and communicating at its discharge end with the latter, and means at the discharge end of said groove for selecting only those pull tabs with trunnions in a leading position, and including a stop shoulder provided on the entry end of said fixed rail and located in opposed relation to the path of travel of the pull tabs from said groove and adjacently above the entry end of the flanges on said fixed rail, said stop shoulder halting the advancing movement of a pull tab selected by said selecting means at the discharge end of said groove and causing the trunnions thereof to engage said entry end of the flanges, and including a spring finger mountd on the entry end of said fixed rail and having its free end extending over the discharge end of said groove, the free end of said spring being constructed and arranged to prevent more than one pull tab approaching said stop shoulder at the same time.

8. In an assembly machine for fastener sliders, a supporting base, a chute mounted on said base for holding a stack of formed slider bodies having front plates provided with lugs, with said lugs all disposed on one side of said chute, said chute having its lower end spaced vertically above a guide surface on said base a distance at least equal to the length of a slider body, a second chute mounted on said base in spaced relation to said slider body chute for holding a stack of slider pull tabs with their trunnions disposed toward the lugs on said slider bodies in said first mentioned chute, said pull tab chute having its lower end spaced vertically above said base and above a pull tab supporting surface a distance at least equal to the thickness of a pull tab, a third chute mounted on said base between said slider body and pull tabe chutes for holding a stack of slider locking housings with their locking projections disposed toward the lugs on said slider bodies in said first mentioned chute, said housing chute having its lower end spaced vertically above said guide surface a distance at least equal to the length of a housing, a container for a bulk mass of formed locking housings mounted on said base in spaced relation to said housing chute, an inclined guide extending from said container to the entry end of said housing chute, means in said container for selecting from the bulk mass and feeding to said guide, housings positioned in a predetermined manner, and for rejecting all housings positioned other than said predetermined manner, a place of assembly located on said base between said slider body chute and said housing chute and spaced therefrom, reciprocating means for selecting the slider body, pull tab and locking housing located below their respective chutes and advancing them to said place of assembly and mounting such housing on the lug of such slider body and positioning such pull tab astraddle of such housing, and means at said place of assembly for attaching both such housing and pull tab to the lug on said slider body.

9. An assembly machine such as defined in claim 8, in which the means for selecting the housings includes a shelf inclined down toward the entry end of said guide, said shelf having a plurality of grooves merging into a single groove a the discharge end thereof, and means at the discharge end of said single groove for selecting from the housings in said groove only those which are positioned on their backs and have their locking projections in a leading position, and for feeding such selected housings to the entry end of said guide.

10. An assembly machine such as defined in claim 8, in which said selecting means comprises a groove inclined down toward the entry end of said guide, a longitudinally extending rail mounted on the discharge end of said groove and located over said groove between the side walls of said groove, the height of said rail above the bottom wall of said groove being less than the overall height of a housing, an inclined ramp formed in the discharge end of said groove and extending transversely of the latter in the region of said rail from a point between the latter and one side wall of said groove through an opening in the other side wall of the groove, and a bumper mounted on said groove adjacent to the entry end of said rail for diverting the leading ends of advancing housings towards said ramp, said bumper, rail and ramp coacting to discharge down said ramp all advancing housings as are positioned on their back in said groove with the locking projections thereof in a trailing position and to permit the feed to the entry end of said guide of all advancing housings as are positioned on their back in said groove with the locking projections thereof in a leading position.

11. An assembly machine such as defined in claim 8, in which said selecting means comprises a groove inclined down toward the entry end of said guide, means mounted on said groove adjacent to the discharge end thereof for obstructing the passage of housings having the locking projections thereof engaging and riding on the bottom wall of said groove, means mounted at the discharge end of said groove for selecting from the remaining housings in said groove only those which are positioned on their backs and have their locking projections in a leading position, and for feeding such selected housings to the entry end of said guide, and means for vibrating said groove.

12. An assembly machine such as defined in claim 10, in which said transverse ramp is located adjacent to the entry end of said rail and has a width less than the length of a housing and the length of said rail, and including a longitudinally extending rail mounted on the entry end of said guide in alignment with the rail at the discharge end of said groove and forming a continuation of said first mentioned rail from the entry end of said guide to a point spaced a substantial distance in advance of the latter.

13. An assembly machine such as defined in claim 8, in which said selecting means comprises a groove inclined down toward the entry end of said guide, the groove having formed in its discharge end a housing discharge ramp extending transversely of said groove from between the side walls thereof through an opening in one of such side walls, a U-shaped plate having one side wall mounted on the other of such side groove walls in the region of said ramp and having the other side wall thereof forming a depending rail extending longitudinally of said groove between the side walls thereof and at a height above the bottom wall of the groove less than the overall height of a housing, and said plate having a bumper located in advance of the entry end of said rail for diverting the leading ends of advancing housings toward said ramp, said plate and ramp coacting to permit the feed from said groove to the entry end of said guide of only those housings advancing in said groove which are positioned on their back with the locking projections thereof in a leading position and to reject from such groove all other housings, said groove and plate being formed to permit ready passage under said rail of those housings discharged down said ramp.

14. In an assembly machine for fastener sliders composed of a body portion having a lug on the front plate thereof, a locking housing pivotally mounted on such lug, and a pull tab having trunnions connected to such lug, a supporting base, a first chute mounted on said base for holding a stack of formed slider bodies with their lugs all disposed to one side of such chute, said chute having its lower end spaced vertically above a guide surface on said base a distance at least equal to the length of a slider body, a second chute mounted on said base in spaced relation to said slider body chute for holding a stack of pull tabs with their trunnions disposed toward the lugs on said slider bodies in said first chute, said pull tab chute having its lower end spaced vertically above said base and above a pull tab supporting surface a distance at least equal to the thickness of a pull tab, a third chute mounted on said base intermediate said body chute and said pull tab chute for holding a stack of locking housings with the locking projections thereof disposed toward the lugs on said slider bodies in said first chute, said housing chute having its lower end spaced vertically above said guide surface a distance at least equal to the length of a housing, a place of assembly located on said base between said slider body chute and said housing chute and spaced therefrom, a first reciprocatable slide for removing the lowermost slider body from the stack thereof formed by said body chute and advancing it along such surface to said place of assembly between said body chute and said housing chute, a second reciprocatable slide for removing the lowermost housing from the stack thereof formed by said housing chute, advancing said housing to said place of assembly and mounting it on the lug of such body at said place of assembly, means coacting with said second slide to position such housing above said guide surface to facilitate the mounting thereof on said body lug, a third reciprocatable slide for removing the lowermost pull tab from the stack thereof formed by said pull tab chute and advancing it to said place of assembly to position the trunnions thereof in proper relation for connection to the body lug with the trunnion lugs thereof astraddle the housing, means at said place of assembly for attaching both such housing and pull tab to the lug on said body, and means for discharging the slider body from said place of assembly.

15. An assembly machine such as defined in claim 14 in which the outer longitudinal side of said housing slide is provided with a longitudinally extending guide groove and in which said pull tab slide is slidably mounted in said groove, a spring normally maintaining said pull tab slide in retracted position relative to said housing slide and yieldably resisting advancing movement of such pull tab slide relative to said housing slide, and means to advance said pull tab slide and through the latter to advance said housing slide.

16. An assembly machine such as defined in claim 14, in which said body slide is constructed and arranged to support the stack of slider bodies in said body chute during its advancement of the lowermost housing from such stack, in which said supporting surface forms part of the upper surface of said housing slide and the latter normally supports said stack of pull tabs in said pull tab chute, and in which said pull tab slide is constructed and arranged relative to said housing slide to support the stack of pull tabs in said pull tab chute during its advancement of the lowermost pull tab from such stack.

17. An assembly machine such as defined in claim 14, in which the leading end of said housing slide forms a continuation of said housing chute in the retracted position of said slide, and in which said coacting positioning means comprises a spring pressed member for maintaining the lowermost housing in the stack thereof formed by such chute against the leading end of said housing slide, means on said housing slide for retracting said member out of the path of the housing slide during the advancing movement of the latter, and a second spring pressed member controlled by said housing slide for supporting the stack of housings in said housing chute during the advancing movement of said housing slide.

18. An assembly machine such as defined in claim 14, in which said discharging means comprises an air line having a discharge end at said place of assembly, a source of air pressure, a valve connecting said source to said air line, and means for actuating said valve at the end of each assembly of said body, housing and pull tab.

19. An assembly machine such as defined in claim 14, in which said attaching means includes a pair of aligned slides movable toward and away from each other, the opposed working ends of said slides including means engageable with the sides of a housing mounted on a body lug and means engageable with the trunnions of a pull tab, and means for simultaneously advancing said slides toward each other to attach a housing and pull tab to the lug on a slider body and for simultaneously withdrawing said slides from the assembled slider to permit discharge of the latter.

20. An assembly machine such as defined in claim 14, in which said attaching means includes a pair of aligned slides movable toward and away from each other, the opposed working ends of said slides including means engageable with the sides of a housing mounted on a body lug and means engageable with the trunnions of a pull tab, a cam member provided on each slide, a plunger having a cam-shaped end engageable with the cam members on said slides, means for actuating said plunger to cause said slides to simultaneously advance toward each other to attach a housing and pull tab to the lug on a slider body, and spring means for retracting said slides when said plunger is withdrawn to permit discharge of the assembled slider.

References Cited in the file of this patent

UNITED STATES PATENTS

| | | |
|---|---|---|
| 828,396 | Fraser | Aug. 14, 1906 |
| 1,212,227 | Jeavons et al. | Jan. 16, 1917 |
| 1,332,538 | Bourque | Mar. 2, 1920 |
| 1,944,360 | Meyer | Jan. 23, 1934 |
| 2,155,958 | Schmidt | Apr. 25, 1939 |
| 2,198,740 | Redman | Apr. 30, 1940 |
| 2,354,690 | Lawson | Aug. 1, 1944 |
| 2,670,531 | Mackey | Mar. 2, 1954 |
| 2,674,755 | Schlicksupp | Apr. 13, 1954 |